Patented Apr. 6, 1954

2,674,586

UNITED STATES PATENT OFFICE 2,674,586

OXIDIZED ISOOLEFIN-CYCLODIOLEFIN COPOLYMERS

Lester Marshall Welch, Madison, N. J., assignor to Standard Oil Development Company, a corporation of Delaware No Drawing. Application April 26, 1950, Serial No. 158,330

9 Claims. (Cl. 260—31.8)

This invention relates to modified isoolefin-cyclodiene copolymers of low unsaturation, and particularly to isobutylene-cyclopentadiene copolymers modified by moderate oxidation, whereby the cold flow of the copolymers is beneficially reduced and their tolerance for plasticizers is increased.

It is well-known that excellent high molecular weight elastomers can be prepared by copolymerization of a major proportion of isobutylene and a minor proportion of a diene such as isoprene, butadiene or cyclopentadiene. Such copolymers are prepared at temperatures below $-40°$ C. by means of a catalytic solution of aluminum chloride or similar Friedel-Crafts halide. Elastomers of this type can be cured with the aid of sulfur, p-quinone dioxime, dinitrosobenzene and other known vlucanizing agents, and have found especially extensive use in the manufacture of inner tubes. Because of their excellent impermeability to gases and their high resistance to various chemical agents, they have likewise shown promise in many other fields. However, these isobutylene copolymers have been normally handicapped by the fact that they undergo viscous flow rather readily, which greatly complicates fabricating operations, and also the most prevalent types tend to depolymerize under the influence of oxygen.

According to the present invention it has now been found that isobutylene-cyclodiene copolymers can be modified by controlled oxidation, whereby the viscous flow characteristics of the product are reduced and at the same time the tolerance of the product for various plasticizers is greatly increased.

This invention is applicable to rubber-like copolymers containing a major proportion of combined isobutylene and a minor proportion of a conjugated cyclodiene having 5 to 8 carbon atoms, notably cyclopentadiene. Other cyclodienes which may be used include: methyl cyclopentadiene, ethyl cyclopentadiene, conjugated cyclohexadienes and so on. Also, instead of isobutylene, other tertiary olefins such as 2-methyl butene-1 or propylene may be used.

In preparing these polymers, usually about 1.5 to 30, or preferably 2.5 to 10 percent by weight of cyclodiene are mixed with the balance of isobutylene, and the resulting mixture is cooled to a polymerization temperature between $-40°$ C. and $-165°$ C., preferably between $-70°$ C. and $-110°$ C. The monomers may also be diluted with a low-freezing, non-polymerizable diluent, the diluent ordinarily being used in a ratio of about 50 to 500 parts per 100 parts of polymerizable reactants. Suitable diluents include the various mono- or polyhalogenated alkanes such as methyl chloride, ethyl chloride, ethylene dichloride and similar fluoro-substituted or fluorochloro-substituted alkanes which are liquid at the polymerization temperature, or carbon disulfide; or $C_2$ to $C_5$ aliphatic hydrocarbons such as ethane, n-butane, i-butane, the pentanes and the like; and also ethylene which, though an olefin, is non-reactive under the polymerization conditions involved here.

The cold reactants, with or without diluent, are polymerized by the application thereto of a liquid Friedel-Crafts catalyst which is preferably aluminum chloride in solution in a low-freezing non-complex forming solvent such as ethyl or methyl chloride, or carbon disulfide. Moreover, with catalysts such as aluminum bromide or aluminum chloro-bromide the light hydrocarbons such as the butanes or pentanes are also very useful solvents. The concentration of the catalyst solution may be between 0.05 to 10%, usually between 0.2 and 3%. Normally about 0.1 to 3.0 grams of Friedel-Crafts halide is required to produce 100 grams of polymer. The details and various alternatives of this polymerization procedure are shown in U. S. Patent No. 2,356,128 which is hereby incorporated into and made part of this specification.

The polymerization reaction can be conducted either in a succession of batch reactions or in the form of a continuous reaction. In either case, the polymer is preferably recovered by discharging the polymerized reaction mixture into warm water. Various slurry stabilizers such as zinc stearate may be added at this point, and the polymer is then ordinarily recovered by straining, followed by drying and milling.

As so prepared, the polymer preferably has a Staudinger molecular weight between about 20,000 and 65,000, or even 100,000; and a Wijs iodine number between about 1 and 50. Ordinarily the polymer has a molecular unsaturation, that is, percentage of copolymerized cyclodiene, between about 0.3 and 15%, or preferably 1 and 10% as determined at 0° C. In any event, it will be understood that the foregoing description has been included herein principally for the sake of convenience, as the polymer per se, as well as its method of preparation, have been known prior to the present invention and are being claimed in application Serial No. 547,274, filed July 29, 1944 by W. J. Sparks and R. M. Thomas.

The isobutylene-diene copolymers of the general type suggested above are characterized by an exceptionally high impermeability to gases and also by their high chemical inertness at or near room temperature. Accordingly, their vulcanizates have found extensive use in the manufacture of inner tubes, gaskets, flexible hoses and so on. However, in the unvulcanized state all of these copolymers exhibit a relatively high rate of viscous flow, which unduly complicates processing operations by causing deformation or collapsing of shaped articles prior to curing. Also because of their inherently high tendency to flow, it has been found commercially impractical heretofore to compound these polymers with sufficiently large amounts of softeners as would have been often desirable where articles are intended for eventual use at low temperatures.

The present invention involves the discovery that isobutylene-cyclodiene copolymers, unlike the similar copolymers of isobutylene with aliphatic diolefins, can be oxidized to give a product of reduced cold flow and increased tolerance for plasticizers.

Depending on the eventual use to which this invention is to be put, the isobutylene-cyclodiene copolymer is moderately oxidized, i. e., about 0.1 to 5%, or usually about 0.2 to 1% of oxygen is introduced into the polymeric molecule. Obviously, if an improvement in processing characteristics is the principal objective, the oxidation step is carried out prior to vulcanization. Smaller amounts of oxygen than indicated above are relatively ineffective since only an insufficient number of cross-links can be created thereby. On the other hand, an amount of oxygen in excess of about 5% is generally undesirable, since this tends to produce resinification of the polymer and concomitant loss of elastic, rubber-like properties. Moreover, to assure against eventual excessive resinification, it is desirable to use a copolymer containing less than about 15%, and preferably less than 10% of combined cyclodiene, the balance being combined isobutylene or other suitable monoolefin.

The required oxidation can be effected in various ways. For example, it can be accomplished by milling the copolymer on a rubber mill in the presence of pure or atmospheric oxygen at a temperature up to about 200° C., preferably between 110 and 150° C. Such oxidative milling may be combined with the normal compounding step, but often it is preferable to carry out the oxidation prior to the addition of vulcanizing agents, so as to avoid the possibility of scorching or premature vulcanization. For obvious reasons, antioxidants should preferably not be present during the oxidation step, but may be added to the mix with beneficial results once the desired degree of oxidation has been obtained. To speed up the oxidation, one may add suitable catalysts or "driers" to the copolymer. For example, one may disperse therein about 0.01 to 1% of a salt of manganese, cobalt, or lead, e. g. the metal salts of naphthenic or octoic acid. The length of the oxidative milling step may vary from about 5 minutes to 1 hour, depending on the temperature of the treatment, presence or absence of drier, unsaturation of the polymer and degree of oxidation desired. It is also possible to carry out the oxidative milling in the presence of an oxygen-liberating compound such as benzoyl peroxide, potassium persulfate, calcium peroxide and the like.

It will be understood also that the desired oxidation may be obtained by methods other than those involving mechanical mastication. For example, the cyclodiene copolymer may be dissolved in a solvent such as carbon tetrachloride, hydrocarbons, drying oils, etc., and the solution blown with air or oxygen, with or without the addition of a catalyst such as one of the driers suggested earlier herein, or the oxidation may also be achieved after the solution is spread out in the form of a protective coating. Depending on specific formulation according to generally known principles, the resulting solutions can be used either directly as cements or protective coating composition, or the solvent may be driven off after the oxidation treatment and the oxidized polymer recovered for further use in dry, solid form.

Illustrative examples of the invention are given below.

EXAMPLE 1

A reaction mixture consisting of 1050 grams methyl chloride, 228 grams isobutylene and 2 grams cyclopentadiene was cooled to −100° C. by means of liquid ethylene as external refrigerant. A catalyst solution containing 0.1 gram of aluminum chloride per 100 grams of methyl chloride was added to the cold reaction mixture at a rate of 74 cc. per minute for 7 minutes. In this period six more grams of cyclopentadiene were also added to the reaction mixture in 2-gram increments as the polymerization proceeded. The reactor contents consisting of a slurry of finely divided particles were dumped into hot water to flash off diluent and unreacted monomers, the resulting solid polymer was separated, washed with water and dried on a hot mill. The dried polymer weighed 80 grams (representing 34% conversion), had a Staudinger molecular weight of 31,000 and an unsaturation of 4.5 mole percent.

In accordance with the present invention portions of polymer prepared as described above were placed on a rubber mill and hot milled in air at 150° C. for 30 minutes. The hot milled product was then compared with the original polymer in terms of carbon hydrogen analysis to determine the degree of oxidation achieved by the hot milling treatment. The cold flow of the two materials was also determined using the following procedure. Samples of the rubber-like material were molded at 142° C. under pressure to make a cylindrical slug ½-inch in height and ¾-inch in diameter. The sample was then placed in an oven for twenty minutes at 40° C. The conditioned slug was then placed in a Williams plastometer having a total weight of 1800 grams on the top platen. As the weight was lowered into the sample, readings were taken at intervals of five to ten seconds until the compressed height reached 0.3 inch. At this point the slug was removed from the plastometer and placed in boiling water for fifteen minutes to allow for elastic recovery. The final height was then measured and the viscous, irreversible flow rate calculated as follows:

Viscous Flow Rate, %/sec. = (linear)

$$\frac{\frac{\text{Original height} - \text{final height}}{\text{Original height}}}{\text{Time of test, sec.}} \times 100\%$$

The results obtained are tabulated below:

|  | C+H | Cold Flow, percent/sec. at 40° C. |
|---|---|---|
|  | *Percent* |  |
| Original polymer | [1] 99.6 | 0.027 |
| Polymer after milling for 30 minutes | [1] 99.3 | 0.00 |
| GR-I (40 Mooney) |  | 0.105 |
| GR-I after milling for 30 minutes |  | 0.500 |

[1] Oxygen by difference: 0.3%.

The above data indicate that the introduction of as little as 0.3% of oxygen reduces the appreciable cold flow rate of the original polymer to zero. In contrast, the ordinary isobutylene-isoprene polymer (GR-I rubber) deteriorates even on mild oxidation in that its rate of cold flow, which is notoriously high to begin with, becomes so bad upon oxidative milling that the resulting polymer is useless as a rubber for inner tubes. Because of this, it is well known that ordinary GR-I compounds should be processed on a mill only when stabilized with a suitable anti-oxidant such as phenyl-beta-naphthylamine.

At the same time, it must be noted that this elimination of the undesirable plastic flow is not accompanied in the cyclopentadiene copolymer by any appreciable hardening or resinification such as might be expected from a high degree of cross-linking, but on the contrary the cyclopentadiene copolymer is actually softened somewhat by the oxidation treatment and its elastic properties are improved thereby. This is illustrated by the following data which represent plastometer readings of total deformation in percent taken during cold flow tests of the several rubber-like materials indicated:

Table I

| Time, secs | 10 | 20 | 40 | 60 | 120 | 180 |
|---|---|---|---|---|---|---|
| Cyclopentadiene polymer | 12 | 14 | 18 | 21 | 26 | 29 |
| Cyclopentadiene (oxidized) | 26 | 32 | 37 | 41.5 |  |  |
| Natural Rubber (40 Mooney) | 21 | 27 | 32.5 | 37 |  |  |
| GR-I (40 Mooney) | 17.5 | 20.5 | 25 | 28 | 33.5 | 38 |

From the above it is apparent that while the original cyclopentadiene polymer is the least deformable of the rubbers tested, upon oxidation this same material surpasses even natural rubber in softness or ability to deform under stress. This is particularly remarkable when it is realized that the deformation of the oxidized cyclopentadiene polymer is essentially elastic and reversible in nature as in the case of natural rubber, whereas in the case of the unoxidized cyclopentadiene polymer as well as in the case of GR-I the deformation reflects a considerable component which is irreversible in nature, i. e. which represents objectionable cold flow.

The demonstrated elimination of cold flow by means of the present invention is most important since it facilitates the processing of the raw polymer. For example, whereas in the manufacture of inner tubes from the original cyclopentadiene polymer considerable difficulty is encountered due to the tendency of the raw extruded tubes to collapse in a manner similar to that encountered with ordinary GR-I rubber, the oxidized product of this invention avoids this difficulty and actually exhibits a concomitant improvement in softness and reversible elasticity.

EXAMPLE 2

Another isobutylene-cyclopentadiene copolymer prepared substantially as described above from a feed contained about 9 grams of cyclopentadiene per 100 grams of isobutylene. The resulting copolymer contained 9.6 mol percent unsaturation and had a Staudinger molecular weight of 21,600. When hot milled in air for 30 minutes at 150° C., the following results were obtained:

|  | C+H | Cold Flow at 40° C., percent/sec. |
|---|---|---|
|  | *Percent* |  |
| Original | 99.6 | 0.135 |
| After Milling | 98.9 | 0.0 |

Oxygen by difference: 0.7%.

The above data show that even when the original polymer has a relatively low molecular weight and correspondingly high cold flow, the latter can be readily avoided by means of the present invention.

EXAMPLE 3

A cyclopentadiene-isobutylene copolymer containing 4.2 mole percent unsaturation was heat treated on a hot mill at 150° C. in the presence of 0.05 weight percent cobalt naphthenate drier to speed up the rate of oxidation. With drier as catalyst only 5 minutes was required to reduce the viscous cold flow of the polymer from 0.05%/sec. to 0.00%/sec. compared to about 30 minutes for a similar polymer in Example 1.

EXAMPLE 4

A reaction mixture containing 1050 grams n-butane diluent, 228 grams isobutylene and 10 grams cyclohexadiene-1,3 was polymerized at −100° C. using a catalyst solution containing 0.2 gram of aluminum chloride per 100 grams of methyl chloride. The product obtained weighed 111 grams, had 1.3 moles percent unsaturation and 30,600 Staudinger molecular weight. This product had oxidation characteristics similar to those described in the preceding examples and accordingly its cold flow could likewise be eliminated by mild oxidation.

EXAMPLE 5

A high degree of cold flow is undesirable in rubber-like materials from a processing viewpoint in general. However, it is particularly objectionable where the rubber compound is intended for low temperature service, since for that purpose it is usually essential to compound the rubber-like polymer with relatively large amounts such as 5, 10 or even 25 weight percent, of liquid plasticizer so as to improve the low temperature elasticity and flexibility of the rubber compound.

The effect of plasticizer concentration on low temperature elasticity or retraction rate of GR-I type vulcanizates was determined for illustration purposes at −40° C. on rubber vulcanizates compounded according to the following formula and cured for 8 minutes at 160° C.:

| | Parts by weight |
|---|---|
| GR–I polymer (40 Mooney) | 100 |
| Zinc oxide | 5 |
| HMF Black | 20 |
| SRF Black | 30 |
| Selenium diethyl dithiocarbamate | 1 |
| Tellurium diethyl dithiocarbamate | 1 |
| Sulfur | 2 |
| Hydrocarbon oil plasticizer [1] | Variable |

[1] "Mentor 28"—a hydrocarbon oil having a specific gravity of 0.815, initial boiling point 518° F., flash point 250° F.

The procedure used for determining the low temperature retraction rate consisted of elongating a standard T–50 dumbbell specimen of each vulcanizate to 150% at room temperature, and chilling the elongated specimen for one minute at −40° C. At the end of this chilling period the sample was allowed to retract to an extent corresponding to 75% elongation. The time in seconds required for this retraction to take place was measured and recorded.

The retraction times determined on the above vulcanizates having variable amounts of plasticizer were as follows:

Table II

| Plasticizer, percent | 0 | 4 | 8 | 12 | 16 | 20 | 30 |
|---|---|---|---|---|---|---|---|
| Retraction time, seconds | 39 | 25 | 15 | 11 | 10 | 10 | 9 |

These data show clearly that increasing amounts of plasticizer greatly improve the low temperature retraction rate of vulcanizates, which is of particularly great importance in inner tube stocks.

However, as was pointed out earlier, while increasing amounts of plasticizer improve the low temperature elasticity of isobutylene-diene copolymer vulcanizates, they also greatly increase the undesirable cold flow of the unvulcanized stocks. Consequently the usefulness of this effective means of improving the low temperature properties of vulcanizates has been limited heretofore by processing considerations, as liquid plasticizer concentrations in excess of about 3% raised the cold flow of standard GR–I inner tube compounds beyond the practical limit tolerable in the industrial manufacture of inner tubes.

Here again the great value of the present invention becomes apparent since the oxidized isobutylene-cyclodiene copolymers, having a greatly reduced viscous flow rate, can be compounded with relatively large amounts of liquid plasticizer and thus their low temperature characteristics can be improved without raising the viscous flow rate of the resulting compound beyond the maximum limit tolerable in the industry. This is illustrated by the following comparison of viscous flow rates of a plasticized standard GR–I compound with the viscous flow rates of an oxidized isobutylene-cyclopentadiene copolymer similarly compounded. The oxidized isobutylene-cyclopentadiene copolymer used in this comparison was the product obtained by milling in air for 30 minutes as described in Example 1.

Both the standard GF–I polymer and the oxidized cyclopentadiene copolymer were compounded with variable amounts of plasticizer and the other ingredients listed in the formula given above in Example 5. The flow rates of the resulting raw compounds were determined by the procedure described in Example 1, except that the total weight used in testing these compounded stocks was 4280 grams where an 1800 gram weight was used with the pure gum stock. The results obtained are shown below.

| Plasticizer concentration, percent | 0 | 3 | 10 | 16 | 30 |
|---|---|---|---|---|---|
| Flow rate of GR–I compound, percent/sec | 0.125 | 0.150 | 0.220 | 0.295 | |
| Flow rate of oxidized cyclopentadiene copolymer, percent/sec | 0.010 | 0.030 | 0.090 | 0.150 | 0.310 |

As the maximum tolerable flow rate for this type of inner tube compound is about 0.15% per second, it is apparent that in the case of standard GR–I polymer no more than about 3% of liquid plasticizer can be used, and thus only a moderate improvement in low temperature elasticity can be obtained as indicated in Table II of this example. In contrast in the case of the oxidized cyclopentadiene copolymer 10 to 15 or more percent of liquid plasticizer may be added without rendering the compound unworkable, and thus a most significant improvement of low temperature characteristics can be obtained.

It will be understood of course that the particular hydrocarbon plasticizer used in this example may be replaced by other common plasticizers of petroleum or coal tar origin, or by liquid plasticizers of the ester type such as dibutyl phthalate, dioctyl phthalate, trioctyl phosphate, tricresyl phosphate, dibutoxy ethyl sebacate, dioctyl sebacate, diethylene glycol and so on. It will also be understood that the particular compounding ingredients and their proportions, as well as other features conventional in the rubber art, have been described herein only for purposes of illustration and that changes may be made therein within the skill of the art and without departing from the scope of the invention claimed hereby.

What is claimed is:

1. A process which consists in contacting a vulcanizable, rubber-like copolymer of an isoolefin having 3 to 5 carbon atoms and a cyclic conjugated diolefin containing both double bonds in the ring having 5 to 8 carbon atoms with an oxidizing agent selected from the group consisting of air, oxygen, benzoyl peroxide, potassium persulfate, and calcium peroxide at a temperature between 90 and 200° C. until 0.1 to 5 weight percent of oxygen is combined with the copolymer.

2. A process which consists in contacting a vulcanizable, rubber-like copolymer of a major proportion of isobutylene and a minor proportion of cyclopentadiene having a Staudinger molecular weight between 20,000 and 100,000 with a free oxygen-containing gas until 0.1 to 1 weight percent of oxygen is combined with the copolymer.

3. A process which consists in mechanically working a vulcanizable, rubber-like copolymer of 80 to 99.5% combined isobutylene and 20 to 0.5% combined cyclopentadiene in the absence of antioxidant and in the presence of air until 0.2 to 1% of oxygen is chemically combined with the copolymer.

4. A process according to claim 3, wherein about 0.01 to 1% of an oxidation catalyst chosen from the group consisting of the metal salts of naphthenic and octoic acids is dispersed in the copolymer prior to the oxidative working.

5. A process according to claim 3, wherein the working is carried out in the presence of about 0.05 weight percent based on copolymer of cobalt naphthenate.

6. A rubber-like product consisting essentially of an oxidized copolymer of a major proportion of isobutylene and a minor proportion of a cyclic conjugated diolefin containing both double bonds in the ring having 5 to 6 carbon atoms, the oxygen content of the oxidized copolymer being between 0.2 and 1% by weight.

7. A composition of matter comprising 100 parts by weight of a rubber-like oxidized copolymer of a major proportion of isobutylene and a minor proportion of cyclopentadiene and 5 to 25 parts by weight of a liquid plasticizer, the copolymer having an oxygen content between 0.2 and 1% by weight.

8. A composition of matter according to claim 7 wherein the plasticizer is a hydrocarbon oil and is used in a concentration between 5 and 15 parts.

9. A composition of matter according to claim 7 wherein the plasticizer is dioctyl phthalate.

References Cited in the file of this patent

UNITED STATES PATENTS

| Number | Name | Date |
|---|---|---|
| 2,356,128 | Thomas | Aug. 22, 1944 |
| 2,462,674 | Rehner | Feb. 22, 1949 |
| 2,494,766 | Lightbown | Jan. 17, 1950 |
| 2,521,359 | Garber | Sept. 5, 1950 |
| 2,568,656 | Parrish | Sept. 18, 1951 |
| 2,577,822 | Sparks | Dec. 11, 1951 |